US011352131B2

(12) United States Patent
Bosworth et al.

(10) Patent No.: US 11,352,131 B2
(45) Date of Patent: Jun. 7, 2022

(54) MULTI-POINT CONTACT, FLEXED LANDING GEAR

(71) Applicant: Aurora Flight Sciences Corporation, Manassas, VA (US)

(72) Inventors: William Robert Bosworth, Cambridge, MA (US); Devin Richard Jensen, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 475 days.

(21) Appl. No.: 16/164,002

(22) Filed: Oct. 18, 2018

(65) Prior Publication Data

US 2020/0122822 A1 Apr. 23, 2020

(51) Int. Cl.
*B64C 25/58* (2006.01)
*B64C 39/02* (2006.01)
*B64C 25/32* (2006.01)

(52) U.S. Cl.
CPC ............ *B64C 25/58* (2013.01); *B64C 39/024* (2013.01); *B64C 2025/325* (2013.01); *B64C 2201/027* (2013.01); *B64C 2201/042* (2013.01); *B64C 2201/108* (2013.01); *B64C 2201/146* (2013.01)

(58) Field of Classification Search
CPC .............. B64C 25/58; B64C 2025/325; B64C 2203/00; B64C 25/06; B64C 25/66
See application file for complete search history.

(56) References Cited

U.S. PATENT DOCUMENTS

| 2,440,068 A | 4/1948 | Beringer |
| 4,077,589 A | 3/1978 | Belolipetsky et al. |
| 4,359,199 A | 11/1982 | Kramer et al. |
| 8,413,927 B2 | 4/2013 | Buchwald et al. |
| 2008/0194170 A1 | 8/2008 | Feng |
| 2009/0283629 A1* | 11/2009 | Kroetsch ............... A63H 27/12 244/17.23 |
| 2015/0329204 A1* | 11/2015 | Nelson ................. B64C 39/024 244/6 |

(Continued)

FOREIGN PATENT DOCUMENTS

| DE | 102010020445 A1 * | 11/2011 | ............... G01B 7/16 |
| EP | 2746155 | 6/2014 | |

OTHER PUBLICATIONS

DE102010020445EnglishTranslation.*

(Continued)

*Primary Examiner* — Assres H Woldemaryam
(74) *Attorney, Agent, or Firm* — Michael Stanley Tomsa; McAndrews, Held & Malloy, Ltd.; Eugene H. Nahm

(57) ABSTRACT

A flexible landing gear system for a vertical take-off and landing (VTOL) aircraft is disclosed. The flexible landing gear system may comprise a mounting bracket, a plurality of flexible supports, and plurality of surface contactors. The mounting bracket may be configured to couple to the VTOL aircraft. Each of the plurality of flexible supports comprising a proximal end and a distal end. The plurality of flexible supports may be coupled to the mounting bracket at a proximal end. A surface contactor may be positioned at the distal end of each of the plurality of flexible supports. The low-friction contactor may be a lightweight spherical ball, while the flexible support may be a flexible semi-rigid wire comprising a tempered high-carbon steel.

19 Claims, 10 Drawing Sheets

(56) References Cited

U.S. PATENT DOCUMENTS

2016/0214707 A1     7/2016  Didey et al.
2016/0272308 A1*    9/2016  Gentry .................... B64C 25/52
2019/0176983 A1*    6/2019  Darnell ................... B64C 25/32

OTHER PUBLICATIONS

Tumari et al. "The Direct Strain Feedback With PID Control Approach For A Flexible Manipulator: Experimental Results". (Year: 2011).*

Prashant D. Khapane, "Simulation of Landing Gear Dynamics Using Flexible Multi-Body Methods," 25th International Congress of the Aeronautical Sciences, Jan. 2006.

* cited by examiner

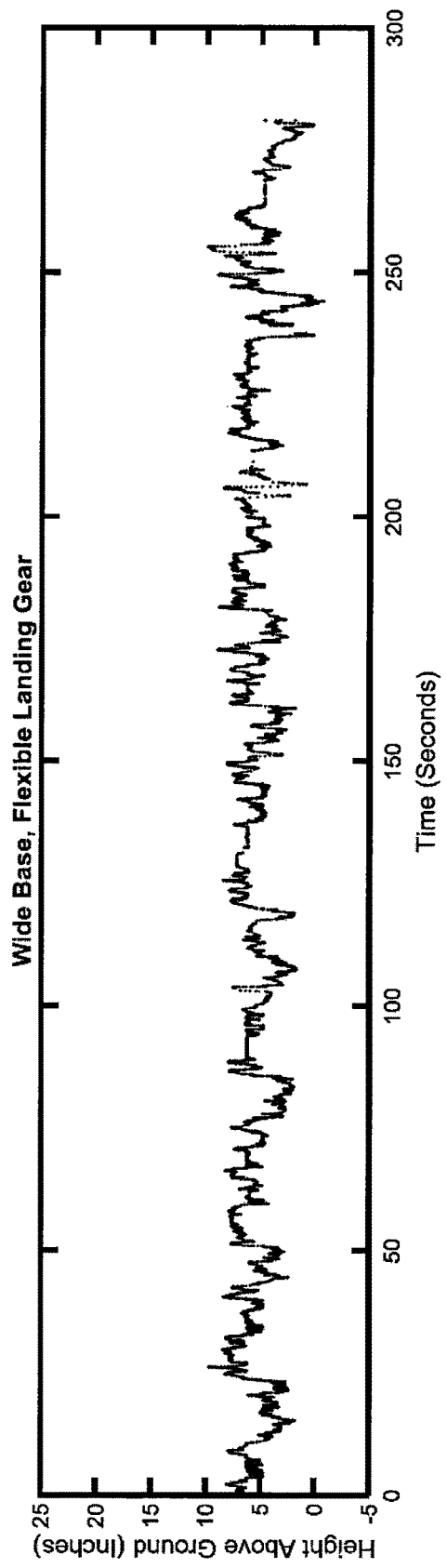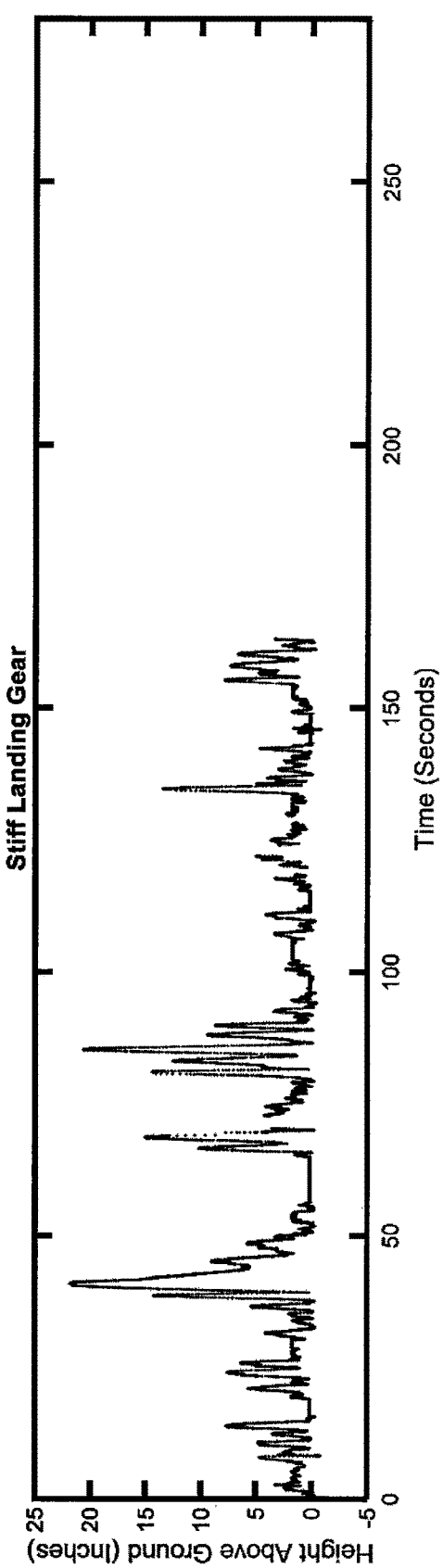

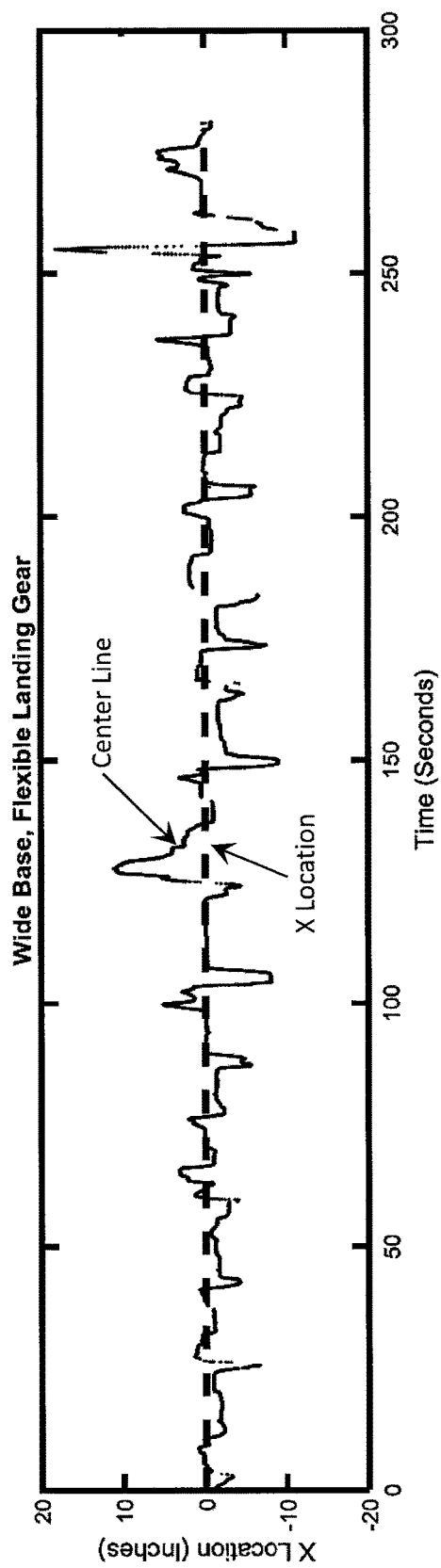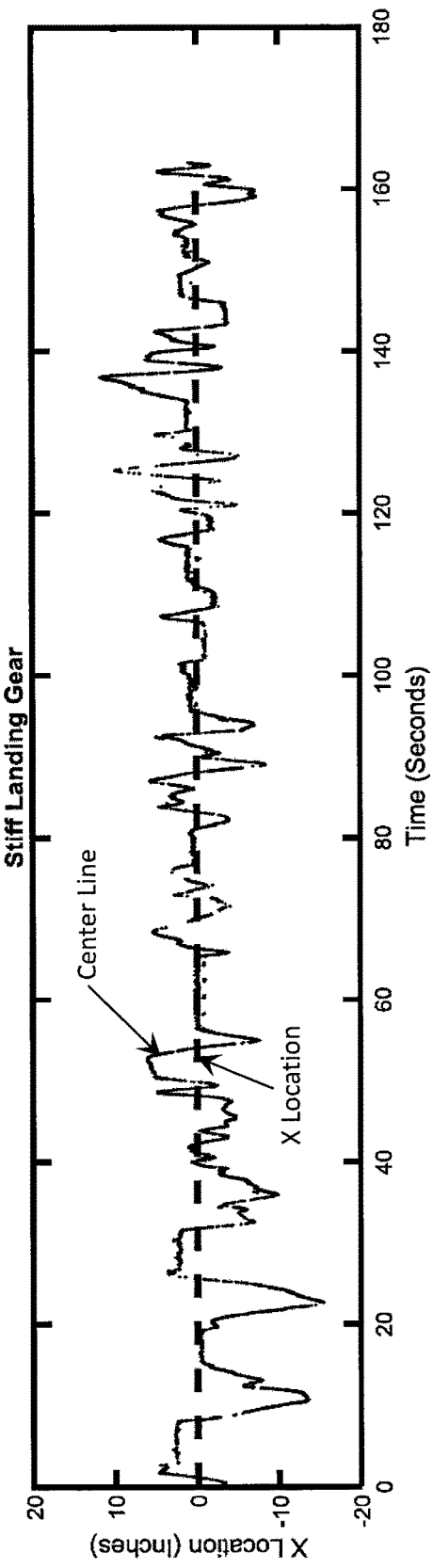

MULTI-POINT CONTACT, FLEXED LANDING GEAR

FIELD

This present disclosure generally relates to aircraft systems, more specifically, to aircraft and flexible landing gear systems.

BACKGROUND

Aircraft, including vertical take-off and landing (VTOL) unmanned aerial vehicles (UAVs), often employ landing gear having rigid legs with high-friction feet (e.g., rubber feet) to contact the a stable surface, such as the ground. Such traditional rigid landing gear, however, offers certain disadvantages. For example, traditional rigid landing gear requires that the VTOL UAV remain parallel to the ground during low flight operations, which can make ground maneuvering difficult. Many applications of various sensors, however, require the sensor to be at a fixed, short distance from the object being examined. For example, non-destructive ultrasonic sensors often require precise contact with the surface to be inspected (often a stable surface).

When rigid landing gear is on the stable surface and all fixed propulsors are generating equal thrust perpendicular to the stable surface, the VTOL UAV can only move perpendicularly to the stable surface. To create motion parallel to the stable surface, the UAV must be tilted by increasing thrust on one side. The imbalanced thrust causes the vehicle to tilt about one foot (or leg), bringing the center of mass over that foot (or leg). The imbalanced thrust maneuver results in a less-stable base, which increases the chances of a propeller-ground strike. Another concern with current multi-rotor landing gear systems is the phenomena called ground effect. The phrase ground effect refers to the phenomena that, when hovering near the ground, there is a nonlinear relationship between air displacement on the propellers and the resulting thrust. This nonlinear relationship is affected by the height between the propulsors and the ground, but there may also be coupling between different propulsors acting on each other. When hovering (or otherwise flying) at high altitude, there is a reliable relationship between RPM of the propulsors and resulting thrust. Additionally, each propulsor's thrust is generally decoupled from each other. When near the ground, however, the relationship between RPM of the propulsor and resulting thrust is non-linear and, therefore, requires significant effort to predict accurately. Existing UAV controllers typically do not implement ground effect modelling or control, thus the resulting nonlinear dynamics generally result in less stable (e.g., more oscillatory) flight.

The above-described downfalls render existing traditional rigid landing gear non-ideal for VTOL UAVs operating near the ground because it is challenging to maintain a small height close to the ground. Therefore, to address the foregoing, a VTOL UAV may be provided with a landing gear system that utilizes flexible components to enable better altitude and position control when operating near the ground. For example, the disclosed flexible landing gear system allows for operation of the VTOL UAV in a low-altitude or semi-landed state without introduction of unwanted forces.

SUMMARY

Disclosed herein are aircraft systems and flexible landing gear systems.

According to a first aspect, a flexible landing gear system for a vertical take-off and landing (VTOL) aircraft comprises: a mounting bracket configured to couple to the VTOL aircraft; a plurality of flexible supports, each of the plurality of flexible supports having a proximal end and a distal end, wherein each of the plurality of flexible supports is coupled to the mounting bracket at its proximal end; and a plurality of surface contactors, wherein a surface contactor is positioned at the distal end of each of the plurality of flexible supports.

In certain aspects, wherein each of the plurality of flexible supports is a flexible semi-rigid wire.

In certain aspects, the flexible semi-rigid wire comprises a tempered high-carbon steel.

In certain aspects, each of the plurality of surface contactors is a low-friction contactor.

In certain aspects, the low-friction contactor is a lightweight spherical ball.

In certain aspects, the lightweight spherical ball comprises celluloid.

In certain aspects, the lightweight spherical ball is hollow.

In certain aspects, the lightweight spherical ball is between 10 mm and 100 mm in diameter.

In certain aspects, the lightweight spherical ball is between 40 mm and 60 mm in diameter.

In certain aspects, the flexible landing gear system further comprises a plurality of strain sensors, each of said plurality of strain sensors being positioned on one of the plurality of flexible supports.

In certain aspects, each of said plurality of strain sensors is positioned on one of the plurality of flexible supports at a location that is between the proximal end and a midpoint that is half way between the proximal end and the distal end.

In certain aspects, the flexible landing gear system further comprises a strain sensor positioned on at least one of the plurality of flexible supports.

In certain aspects, the strain sensor is positioned on the at least one of the plurality of flexible supports at a location that is between the proximal end and a midpoint that is half way between the proximal end and the distal end.

In certain aspects, the strain sensor provides feedback to the aircraft control system.

In certain aspects, the strain gauge is operatively coupled to a flight controller of the aircraft and is used to quantify a contact force between the aircraft and a stable surface.

In certain aspects, the plurality of flexible supports are arranged to flare conically from the mounting bracket, thereby defining a wide footprint.

In certain aspects, the wide footprint has an area that is at least double an area defined by the mounting bracket's perimeter.

In certain aspects, the wide footprint has an area that is at least quadruple an area defined by the mounting bracket's perimeter.

In certain aspects, the mounting bracket comprises a plurality of slots along its perimeter, each slot being configured to secure one of said plurality of flexible supports at its proximal end.

In certain aspects, the plurality of slots is evenly distributed along the perimeter.

In certain aspects, the perimeter is circular in shape.

In certain aspects, the plurality of slots comprises 12 slots.

In certain aspects, the plurality of slots enables a user to selectively secure a desired quantity of flexible supports to account for a desired payload or weight distribution.

In certain aspects, the desired quantity of flexible supports is between 3 and 12.

In certain aspects, the mounting bracket is removably coupled to the airframe and comprises steel or steel alloy.

In certain aspects, the mounting bracket is removably coupled to the airframe and comprises aluminum or aluminum alloy.

In certain aspects, each of the plurality of flexible supports is configured to flex independently.

According to a second aspect, a method for using a flexible landing gear system in an aircraft comprises: providing an airframe; providing a flexible landing gear system, the flexible landing gear system comprising a plurality of flexible supports and a plurality of surface contactors; and coupling the flexible landing gear system to the airframe, wherein each of the plurality of flexible supports has a proximal end and a distal end, each of the plurality of flexible supports being coupled to the airframe at its proximal end, and wherein a surface contactor is positioned at the distal end of each of the plurality of flexible supports.

In certain aspects, the method further comprises the step of operating the aircraft at a low altitude relative to a stable surface.

In certain aspects, the aircraft maintains contact between at least one surface contactor and the stable surface during said step of operating the aircraft at a low altitude.

In certain aspects, each of the plurality of flexible supports is coupled to the airframe at its proximal end via a mounting bracket.

In certain aspects, each of the plurality of flexible supports is a flexible semi-rigid wire.

In certain aspects, the flexible semi-rigid wire comprises a tempered high-carbon steel.

In certain aspects, each of the plurality of surface contactors is a low-friction contactor.

In certain aspects, the low-friction contactor is a lightweight spherical ball.

In certain aspects, the lightweight spherical ball comprises celluloid.

In certain aspects, the lightweight spherical ball is hollow.

In certain aspects, the lightweight spherical ball is between 10 mm and 100 mm in diameter.

In certain aspects, the lightweight spherical ball is between 40 mm and 60 mm in diameter.

In certain aspects, each of the plurality of flexible supports comprises a strain sensor.

In certain aspects, the strain sensor is positioned on a flexible support at a location that is between the proximal end and a midpoint that is half way between the proximal end and the distal end.

In certain aspects, at least one of the plurality of flexible supports comprises a strain sensor.

In certain aspects, the strain sensor is positioned on the at least one of the plurality of flexible supports at a location that is between the proximal end and a midpoint that is half way between the proximal end and the distal end.

In certain aspects, the strain sensor provides feedback to the aircraft.

In certain aspects, the strain gauge is operatively coupled to a flight controller of the aircraft and is used to quantify a contact force between the aircraft and a stable surface.

In certain aspects, the plurality of flexible supports are arranged to flare conically from the mounting bracket, thereby defining a wide footprint.

In certain aspects, the wide footprint has an area that is at least double an area defined by the mounting bracket's perimeter.

In certain aspects, the wide footprint has an area that is at least quadruple an area defined by the mounting bracket's perimeter.

In certain aspects, the mounting bracket comprises a plurality of slots along its perimeter, each slot being configured to secure one of said plurality of flexible supports at its proximal end.

In certain aspects, the plurality of slots is evenly distributed along the perimeter.

In certain aspects, the perimeter is circular in shape.

In certain aspects, the plurality of slots comprises 12 slots.

In certain aspects, the plurality of slots enables a user to selectively secure a desired quantity of flexible supports to account for a desired payload or weight distribution.

In certain aspects, the desired quantity of flexible supports is between 3 and 12.

In certain aspects, the mounting bracket comprises steel or steel alloy.

In certain aspects, the mounting bracket comprises aluminum or aluminum alloy.

In certain aspects, each of the plurality of flexible supports is configured to flex independently.

According to a third aspect, an aircraft comprises: an airframe; a plurality of rotor booms extending radially from the airframe; a plurality of propulsors, each of said plurality of propulsors positioned at a distal end of one of said plurality of rotor booms, wherein the plurality of propulsor are configured to be controlled by an aircraft processor; and a flexible landing gear system coupled to the airframe, the flexible landing gear system comprising a plurality of flexible supports and a plurality of surface contactors, wherein each of the plurality of flexible supports has a proximal end and a distal end, each of the plurality of flexible supports being coupled to the airframe at its proximal end, and wherein a surface contactor is positioned at the distal end of each of the plurality of flexible supports.

In certain aspects, each of the plurality of flexible supports is coupled to the airframe at its proximal end via a removable mounting bracket.

In certain aspects, each of the plurality of flexible supports is a flexible semi-rigid wire.

In certain aspects, each of the plurality of surface contactors is a low-friction contactor.

In certain aspects, the low-friction contactor is a hollow, lightweight spherical ball.

In certain aspects, the aircraft further comprises a strain sensor positioned on at least one of the plurality of flexible supports.

In certain aspects, the strain sensor provides feedback to a flight controller of the aircraft to quantify a contact force between the aircraft and a stable surface.

In certain aspects, each of the plurality of flexible supports is configured to flex independently.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

FIG. 1b illustrates a block diagram of an example aircraft control system for the aircraft of FIG. 1a.

FIGS. 4a through 4c illustrate the example flexible landing gear system of FIG. 3a.

FIGS. 5a and 5b illustrate a graph of the hover performance of a VTOL UAV equipped with stiff landing gear vis-à-vis a VTOL UAV with wide-base, flexible landing gear.

FIGS. 7b and 7c illustrate a graph of the out of plane performance of a VTOL UAV equipped with stiff landing gear vis-à-vis a VTOL UAV with wide-base, flexible landing gear.

DETAILED DESCRIPTION

Figure 1A:
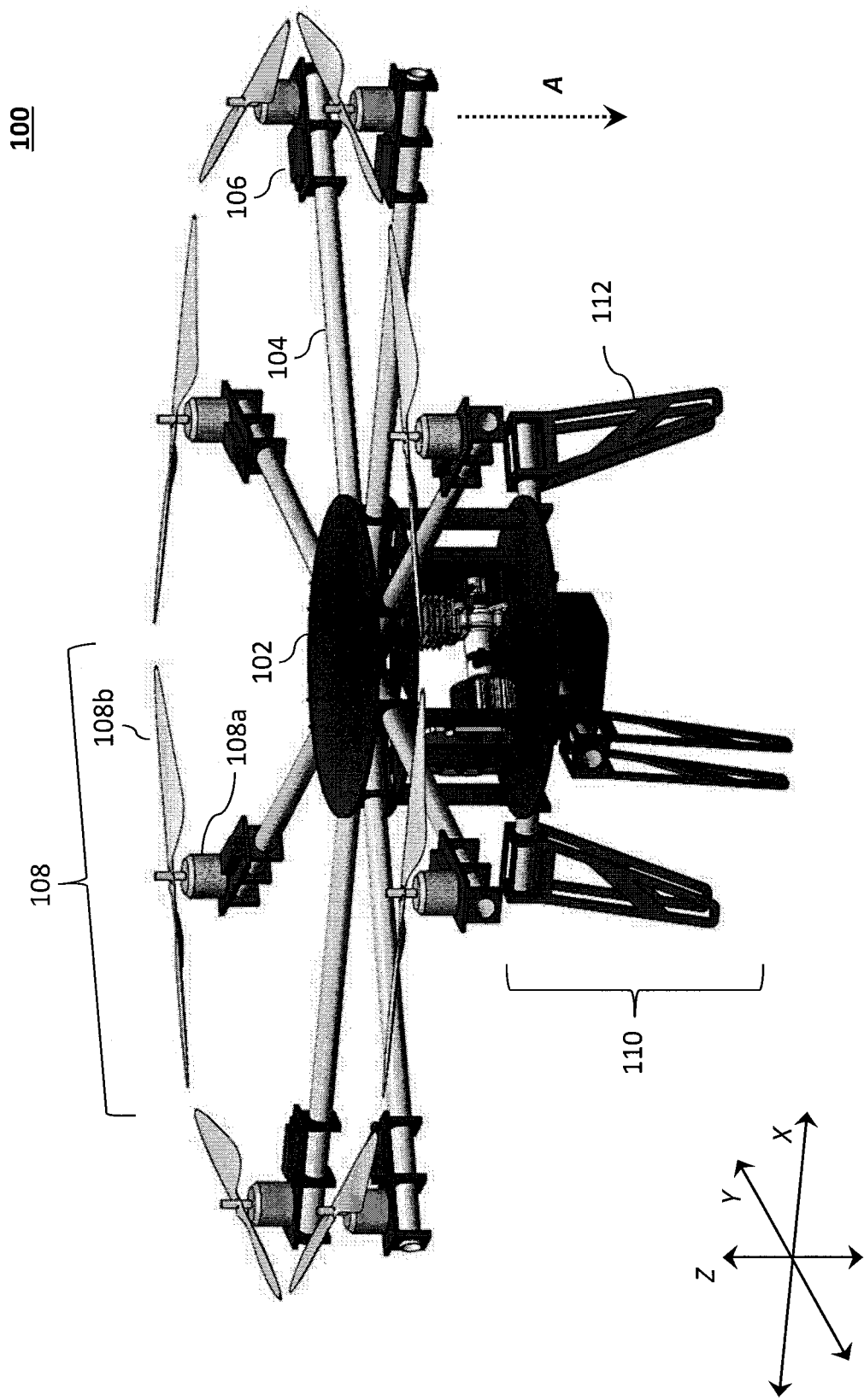
FIG. 1a illustrates an example multi-rotor vertical take-off and landing (VTOL) unmanned aerial vehicles (UAV) for use with a ground manipulation system.

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms. For this disclosure, the following terms and definitions shall apply:

The terms "aerial vehicle" and "aircraft" refer to a machine capable of flight, including, but not limited to, fixed-wing aircraft, UAVs, variable wing aircraft, and vertical take-off and landing (VTOL) aircraft.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electro-magnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

As noted above, VTOL UAVs often employ rigid landing gear having two or more rigid plastic legs. Typically, each rigid plastic leg includes a high-friction contactor, such as rubber feet (or pads), that serve as the ground contact points, thereby increasing friction with the ground. However, rigid landing gear offers certain disadvantages—particularly during low-altitude and semi-landed operation. For example, due to oscillations in height, which are intrinsic to control and are exacerbated by ground effect, it can be difficult to fly a VTOL UAV with conventional landing gear at a low altitude above the ground (or in light-contact with the ground). As noted above, ground effect increases oscillations, thereby resulting in a discontinuous impact with the ground when using rigid landing gear. Such discontinuous impact results in decreased flight performance and hover accuracy.

Therefore, disclosed herein is a VTOL UAV with a flexible landing gear system that is capable of low-altitude and semi-landed operation. A flexible landing gear system as described herein allows for a suspension to help regulate the contact between the VTOL UAV and the ground. That is, the disclosed flexible landing gear system enables more accurate and precise hover when the VTOL UAV is near a ground surface by providing a suspension between the vehicle and hard ground. When rigid landing gear contacts the ground, the resulting impact force is abrupt and approximately discontinuous, which creates a larger acceleration on the body of the VTOL UAV. The flexible landing gear systems disclosed herein may be integrated with an aircraft during design or configured as a retrofit system to attach to any existing aircraft. The disclosed flexible landing gear systems may be employed in connection with various aircraft configurations, including, inter alia, multi-rotor consumer VTOL UAVs and other light weight aircraft. As will be apparent from the present disclosure, the disclosed flexible landing gear system offers a number of advantages, especially during low-altitude and semi-landed operation.

As illustrated in FIG. 1a, a VTOL UAV 100 generally comprises an airframe 102 (e.g., a fuselage or other structure), a plurality of rotor booms 104 (e.g., longitudinal booms) extending radially from the airframe 102, rigid landing gear 110, and a plurality of propulsors 108. The airframe 102 may be coupled with a proximal end of each of the plurality of rotor booms 104 such that the distal ends of the plurality of rotor booms 104 extend radially from the airframe 102. The airframe 102 and the plurality of rotor booms 104 may be fabricated as a singular unit, or as separate components to be coupled to one another. The distal end of each of the plurality of rotor booms 104 may be coupled with a propulsor 108, each of which is illustrated as a lift motor 108a coupled to, and configured to drive/rotate, a propeller 108b. Each of said plurality of propulsors 108 can be placed at a distal end of a rotor boom 104 and oriented to direct thrust downward (direction A) to provide lift. The lift motor 108a may be an electric motor controlled via an electronic speed controller (ESC) 106. To that end, an ESC 106 may also be provided on (or integrated with) each rotor boom 104, for example, adjacent the lift motor 108a. While the UAV 100 is illustrated as having eight propulsors 108 (i.e., an octo-rotor aircraft), a person of skill in the art would understand that additional, or fewer, propulsors 108 may be employed to achieve a desired function and depending on, for example, thrust requirements.

While the lift motors 108a are illustrated at the distal end of each rotor boom 104, the lift motors 108a (or a single lift motor 108a) may instead be positioned at the airframe 102 and configured to drive (rotate) the one or more propellers 108b via a gearbox and/or a driveshaft between the lift motor 108a and the one or more propellers 108b. Further, while each rotor boom 104 is illustrated as having only a single propulsor 108, multiple propulsors 108 may be provided at the distal end of each rotor boom 104. For example, a cross-member may be positioned at the distal end of each rotor boom 104 and arranged to space the propulsors 108 from one another (e.g., perpendicularly to the length of the rotor boom 104) or to otherwise prevent interference between propellers 108b (e.g., a staggered/overlapping configuration). The components of the UAV 100 may be fabricated from metal, plastic, composite materials, engineered materials, or a combination thereof.

While a rigid landing gear 110 is illustrated with a plurality of rigid struts 112 positioned along the perimeter of the airframe 102, as will be discussed, the rigid landing gear 110 may be replaced with the disclosed flexible landing gear system (e.g., flexible landing gear systems 300a, 300b) to increase ground stability. Therefore, the rigid landing gear 110 may be removed (e.g., removably coupled) from the airframe 102 of the UAV 100 to facilitate replacement and/or interchangeability of the rigid landing gear 110 with other forms of landing gear.

In one example, the rigid landing gear 110 may be replaced when damaged or based on the type of ground surface/flight operation. That is, some operations may warrant a flexible landing gear system. Similarly, certain stable surfaces may warrant a different type of ground contact surfaces (e.g., whether high-friction or low-friction) or a larger footprint at each contact point (e.g., the ground contact plates). Therefore, the landing gear may be permanently or removably coupled with the airframe 102 using a mounting bracket. When removable, the mounting bracket may be sized and shaped to interface with a corresponding bracket or recess on the airframe 102. For example, the mounting bracket may be configured to couple to the airframe 102 through a twist-and-lock mechanism.

Figure 1B:
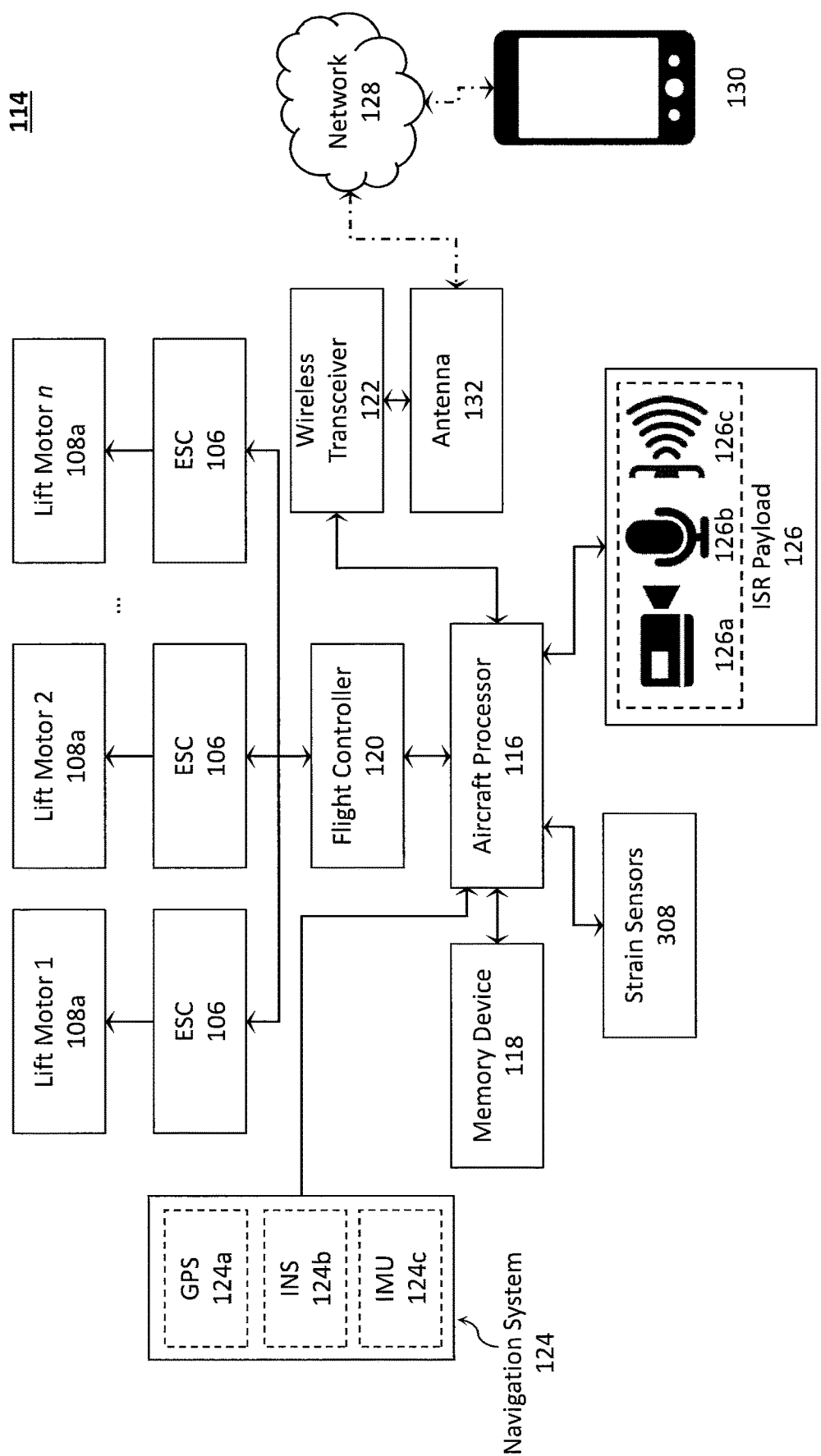

FIG. 1b illustrates a block diagram of an example aircraft control system 114 for the UAV 100. The aircraft control system 114 is configured to control the various aircraft components and functions of the UAV 100. As illustrated, the UAV 100 includes one or more aircraft processors 116 communicatively coupled with at least one memory device 118, a flight controller 120, a wireless transceiver 122, and a navigation system 124. The aircraft processor 116 may be configured to perform one or more operations based at least in part on instructions (e.g., software) and one or more databases stored to the memory device 118 (e.g., hard drive, flash memory, or the like).

The aircraft control system 114 may further include other desired services, such as a wireless transceiver 122 coupled with an antenna 132 to communicate data between the UAV 100 and a remote resource 130 (e.g., a base station or a portable electronic device, such as smartphones, tablets, and laptop computers). For example, the UAV 100 may communicate data (processed data, unprocessed data, etc.) with the remote resource 130 over a network 128. In certain aspects, the wireless transceiver 122 may be configured to communicate (e.g., with the remote resource 130) using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. The remote resource 130 may facilitate monitoring and/or control of the UAV 100 and its payload(s), including the intelligence, surveillance, and reconnaissance (ISR) payload 126.

The aircraft processor 116 may be operatively coupled to the flight controller 120 to control operation of the various actuators (e.g., those to control movement of any flight surfaces) and/or lift motor 108a (e.g., via ESC 106) in response to commands from an operator, autopilot, a navigation system 124, or other high-level system via the wireless transceiver 122. In certain aspects, the aircraft processor 116 and the flight controller 120 may be integrated into a single component or circuit. In operation, the flight controller 120 may dynamically (i.e., in real-time or near real-time) and independently adjust thrust from each of the propulsors 108 on each rotor boom 104 during the various stages of flight (e.g., take-off, cruising, landing) via the ESC 106 to control roll, pitch, or yaw of the UAV 100. In other words, the flight controller 120 can independently control each of the lift motors 108a on a given rotor boom 104 to generate a desired lift thrust for each of the lift motors 108a. For example, the flight controller 120 may vary the revolutions per minute (RPM) of the propellers 108b and/or, where desired, vary the pitch of the rotor blades. Specifically, the lift motors 108a may be controlled by adjusting power supplied to each electric lift motor 108a from a power supply (e.g., a battery pack or a battery bank) via the ESC 106.

The aircraft processor 116 may be operatively coupled to the navigation system 124, which may include a global positioning system (GPS) 124a that is communicatively coupled with an Inertial Navigation System (INS) 124b and/or an inertial measurement unit (IMU) 124c, which can include one or more gyroscopes and accelerometers. The GPS 124a gives an absolute drift-free position value that can be used to reset the INS solution or can be blended with it by use of a mathematical algorithm, such as a Kalman Filter. The navigation system 124 may communicate, inter alia, inertial stabilization data to the aircraft processor 116. In certain aspects, the GPS 124a may be (or include) a differential global positioning system (DGPS). A DGPS provides improved location accuracy; achieving accuracy to about 10 cm. A DGPS uses a network of fixed ground-based reference stations to broadcast a difference between the positions indicated by the GPS satellite systems and the known fixed positions. These stations broadcast the difference between the measured satellite pseudo ranges and actual (internally computed) pseudo ranges, and receiver stations may correct their pseudo ranges by the same amount. The digital correction signal is typically broadcast locally over ground-based transmitters of shorter range.

To collect data and/or monitor an area, the UAV 100 may further be equipped with an ISR payload 126 comprising, for example, one or more cameras 126a (e.g., an optical instrument for recording or capturing images and/or video, including light detection and ranging (LIDAR) devices), audio devices 126b (e.g., microphones, echolocation sensors, etc.), and other sensors 126c to facilitate ISR functionality and provide ISR data (e.g., photographs, video, audio, sensor measurements, etc.). The ISR payload 126 is operatively coupled to the aircraft processor 116 to facilitate communication of the ISR data between the ISR payload 126 and the aircraft processor 116. The ISR data may be used to navigate the UAV 100. The ISR payload 126 may be rotatably and pivotally coupled to, for example, the airframe 102 (or another structural component, such as the rotor booms 104) via a gimbal system to enable the ISR payload 126 to be oriented toward a target area. The ISR data may be dynamically or periodically communicated from the UAV 100 to the remote resource 130 over the network 128 via the wireless transceiver 122, or stored to the memory device 118 for later access or processing. The aircraft processor 116 may also be operatively coupled with one or more feedback sensors positioned on the landing gear (e.g., strain sensors 308).

Figure 2A:
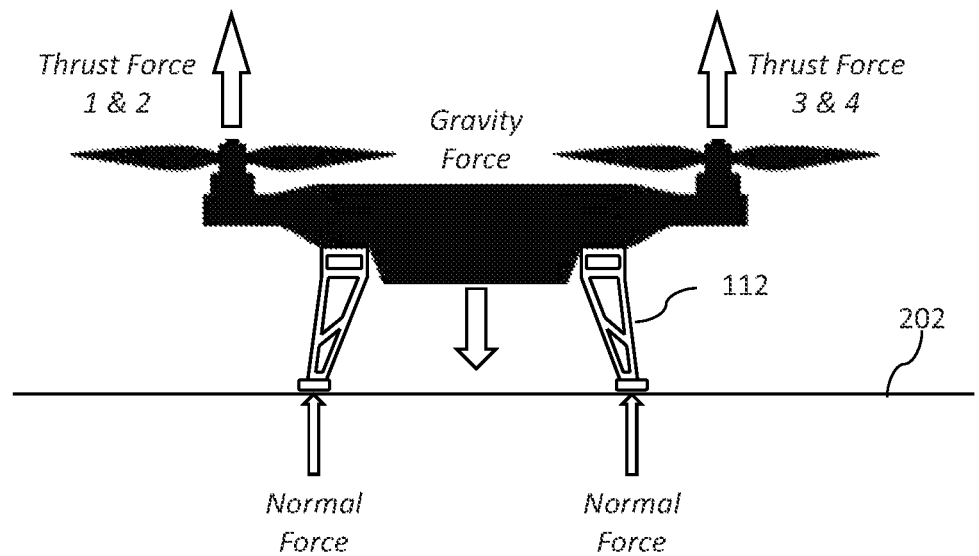
FIGS. 2a and 2b illustrate a VTOL UAV equipped with traditional rigid landing gear.
Figure 2B:
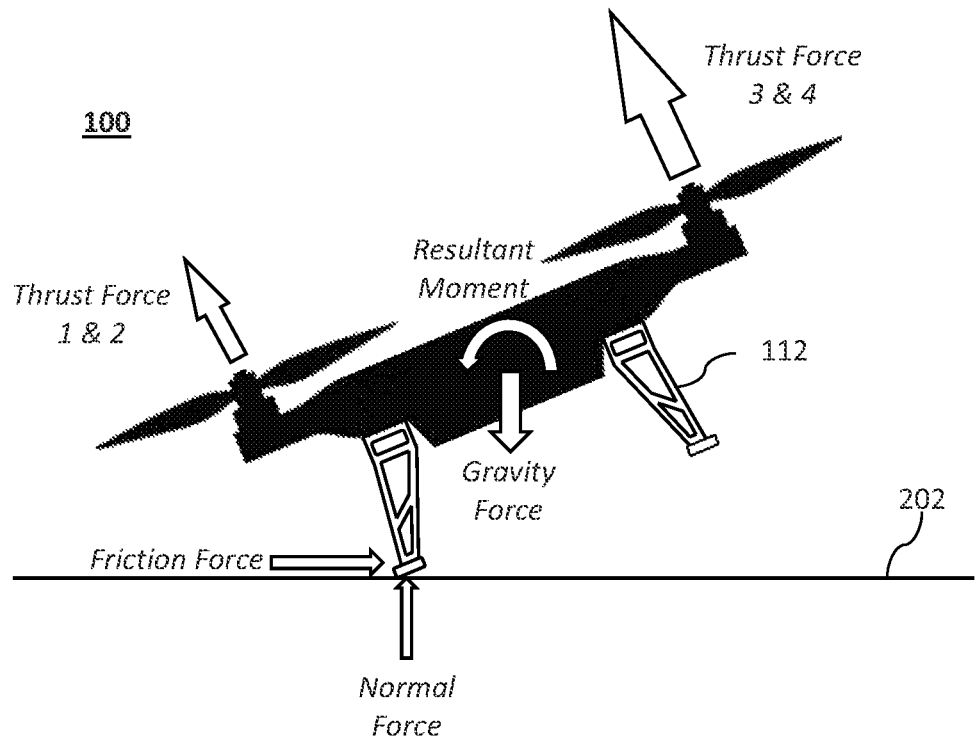

While rigid landing gear 110 can be suitable in certain operations (e.g., in flight operations where low-altitude flight is minimal and/or not required or where landing is performed on flat ground and does not require high accuracy), traditional rigid landing gear offers certain disadvantages—particularly during low-altitude flight and semi-landed operation. FIGS. 2a and 2b illustrate diagrams of a UAV 100 equipped with traditional rigid landing gear 110 during low-altitude operation. As illustrated, the rigid landing gear 110 necessitates, during low-altitude and semi-landed operation, that the UAV to remain substantially parallel to the stable surface 202 (e.g., the ground or a structure, such as a building, bridge, or other object to be examined, etc.). This necessity is further amplified where the landing gear's feet (surface contactors) employ a material with a high coefficient of friction (e.g., rubber feet). Specifically, the free body diagrams of FIGS. 2a and 2b illustrate how the ground parallel and high friction constraints can make ground maneuvering difficult during low-altitude and semi-landed operation. With reference to FIG. 2a, when both rigid struts 112 are on the stable surface 202 and all propulsors 108 are creating equal thrust (thrust forces 1, 2, 3, 4) perpendicular to the stable surface 202, the UAV 100 can only move perpendicularly relative to the stable surface 202. That is, each propulsor 108 of a multirotor (e.g., a quadcopter) generates the same, balanced thrust to fly parallel/balance to the stable surface 202, which is a reason that multirotor UAVs 100 typically has the same size propeller per propulsor 108.

Figure 2C:
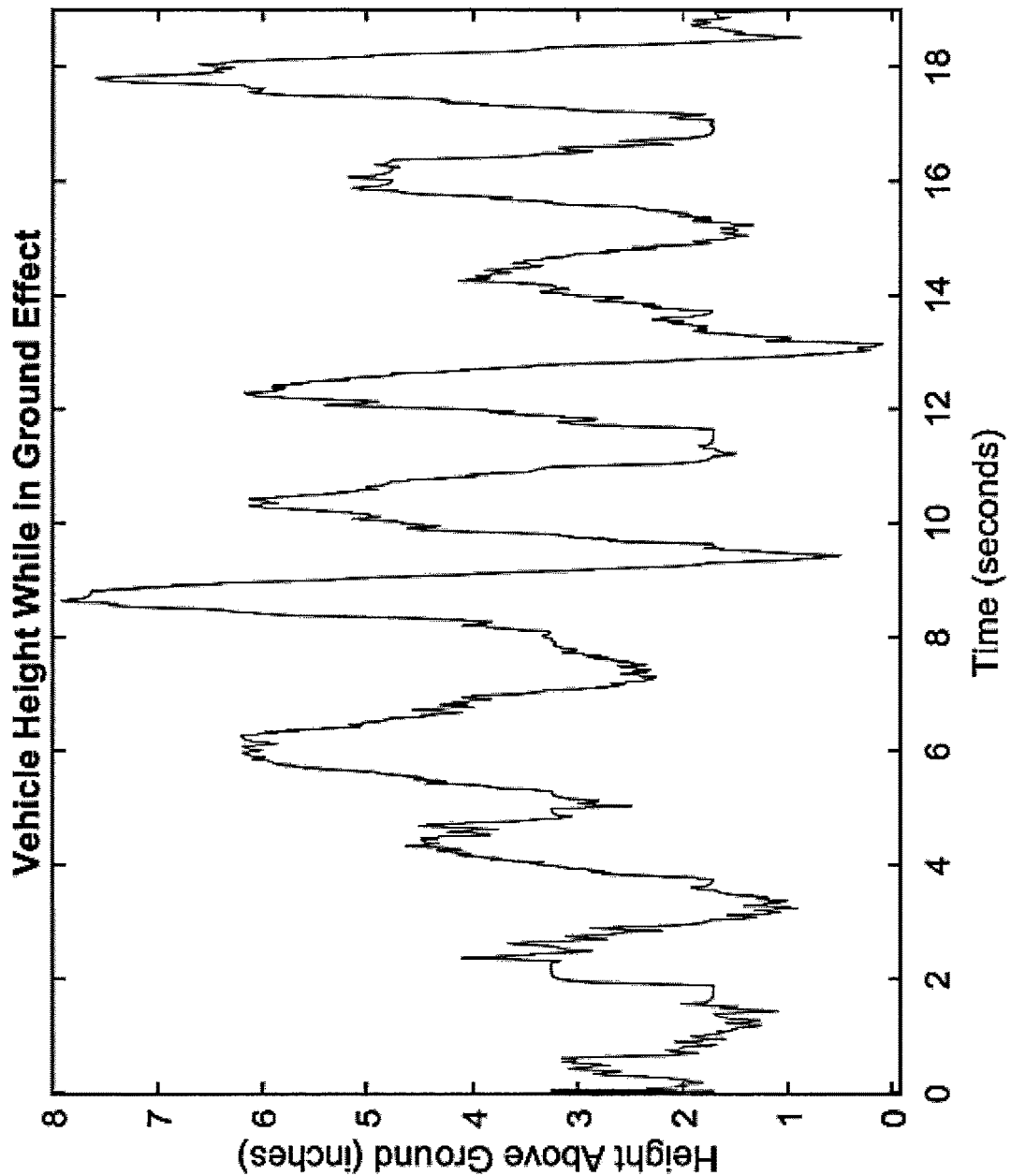
FIG. 2c illustrates a graph of the ground effect flight data of an example VTOL UAV with traditional rigid landing gear.

To create motion that is parallel to the ground, as illustrated in FIG. 2b, the UAV 100 must be tilted by increasing thrust on one side. For example, the propulsors 108 on the right side generated more thrust (Thrust Force 3, 4) than the thrust generated on the left side (Thrust Force 1, 2). The imbalanced thrust causes the UAV 100 to tilt about one gear (e.g., the left rigid strut 112—as illustrated in FIG. 2b), moving the center of mass of the UAV 100 towards or over the gear. The overall result of this imbalanced thrust maneuver is a less stable base increasing the chances of a propeller strike with the stable surface 202. This configuration resembles an inverted pendulum—a passively unstable dynamic system. The wide-base flexible landing gear provides the ability to pitch the UAV body while maintaining a circle or polygon of contact with the ground. The flexible landing gear also provides a restoring torque to the body which makes it harder to trip over itself, whereas the rigid landing gear does not. That is, if a rigid landing gear were given a wide base of support, it would be less likely to trip over itself, but it would also be more difficult to tilt the UAV 100 while on the ground. Another concern with traditional rigid landing gear 110 is a phenomenon called ground effect. When a UAV 100 operates close to the stable surface 202, the UAV 100 can cyclically gain and lose altitude. An example of this effect is seen in the graph of FIG. 2c, which provides data captured from a flight test demonstrating that the UAV 100 can be difficult to control near the stable surface 202. As can be appreciated from the data, ground effect results in unpredictable flight behavior when attempting to hover near the stable surface 202.

Unpredictable flight behavior can be particularly problematic in applications that require a sensor be at a fixed, short distance from the target object being examined (often ground objects or other stable objects). For example, non-destructive ultrasonic sensors often require precise contact with the surface to be inspected. In this case, it is advantageous to operate the UAV 100 in a semi-landed operation (e.g., hovering, but maintaining a degree of contact with the stable surface 202). Another example is the use of an optical camera, where maintaining a fixed distance allows a fixed scale to be used when determining the size of objects in frame. The distance restrictions can limit uses of these sensors, or require a labor intensive process to use them. An example would be performing scheduled inspections on a large composite item such as a wing skin. The use of multi-rotor UAV 100 for precision sensor tasks could reduce costs and increase precision. However the above-described downfalls render existing rigid landing gear 110 non-ideal because it is challenging to maintain a small height close to the stable surface 202 (or in contact with the stable surface 202). Therefore, the UAV 100 may instead use a non-rigid landing gear system having flexible components to enable better altitude and position control when near the stable surface and allow for a taxi behavior similar to conventional aircraft.

Figure 3A:
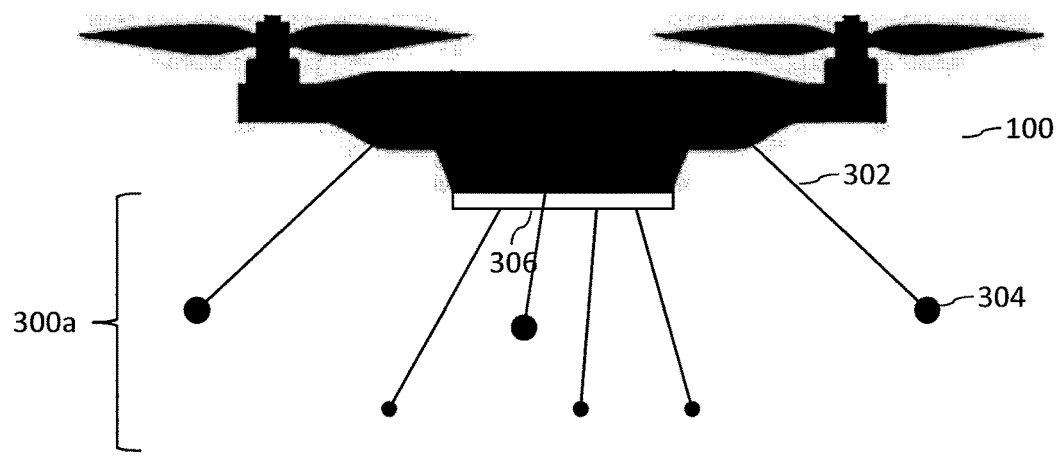
FIGS. 3a through 3c illustrate VTOL UAVs with example flexible landing gear systems.
Figure 3B:
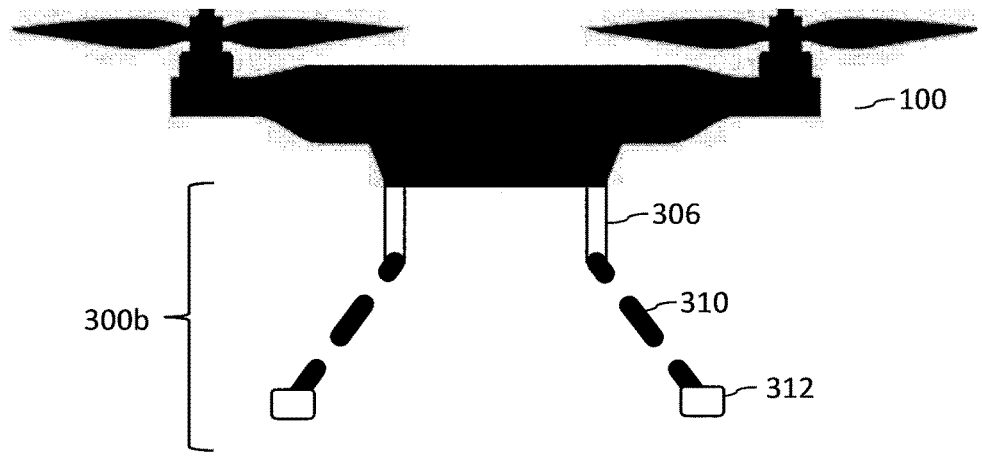
Figure 3C:
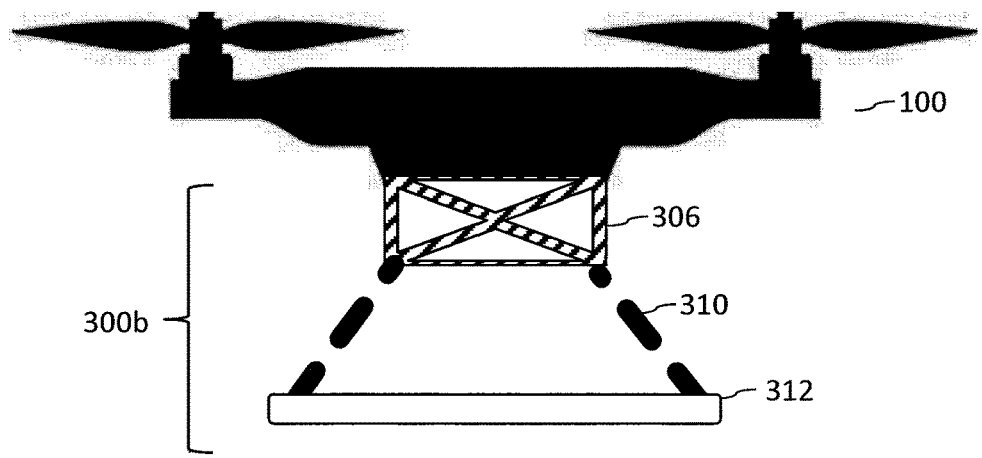

FIGS. 3a through 3c illustrate two example flexible landing gear systems 300a, 300b. Flexible landing gear systems 300a, 300b allow for operation of the UAV 100 at very low altitude and/or in a semi-landed state without introduction of unwanted forces. That is, the flexible landing gear systems 300a, 300b can maintain contact with the stable surface 202, which provides a stabilize force to the UAV 100, and enables the UAV 100 to maintain a controlled distance to the stable surface 202 (whether the ground or a target structure). In this configuration, the UAV 100 can still move around on the stable surface 202, but benefit from feedback and stability from the stable surface 202. In this state, the UAV's 100 hover height may be closely controlled by changing the load on the flexed landing gear systems 300a, 300b. The flexible landing gear systems 300a, 300b enable the UAV 100 to be tilted, while maintaining contact (at least in part) with the stable surface 202, thereby allowing for movement parallel to the stable surface 202.

A potential application of the flexible landing gear system 300a, 300b is to enable the use of multirotor UAVs 100 to perform inspections that require traveling along possibly uneven stable surfaces 202 while maintaining a fixed tolerance vertical distance from the stable surface 202 and minimizing the contact forces applied by the flexible landing gear 300a, 300b onto the stable surface 202. By way of illustration, a specific application would be inspection of target structure, such as a building, a bridge, or an aerostructure (e.g., a wing or fuselage).

Typical rigid multi-rotor landing gear 110 only permit one aircraft attitude and distance from ground when the rigid landing gear 110 is in contact with the stable surface 202. By using landing gear components that flex outwardly when a force is applied, it is possible to settle the UAV 100 at different heights from the stable surface 202 by varying the load on the flexible landing gear 300a, 300b. The load on each component of the flexible landing gear 300a, 300b affects the amount of deformation and the height of the UAV 100 from the stable surface 202. These different heights may be maintained while mitigating the periodic ground effect that results from hovering at the same heights with conventional landing gear.

The different sections of the flexible landing gear 300a, 300b can be decoupled and permitted to flex independently of one another. Therefore, each of the flexible supports may be configured to flex independently. The independent flexing allows for the vehicle to settle in an attitude not parallel with the ground, while maintaining a wide base of contact with the ground. Provided the points of contact with the stable surface 202 are low friction interfaces, the settled and tilted attitude allow the UAV 100 to slide across the ground at a controlled rate without tipping over. By taking advantage of the precise altitude control and sliding behaviors, very precise paths can be planned and achieved. A flexible landing gear system 300a, 300b could also be used to allow a UAV 100 to easily slide into a charging dock or move through a tightly constrained space.

With reference to the figures, the flexible landing gear system 300a, 300b may be provided in one of multiple forms. For example, as illustrated in FIG. 3a, a first flexible landing gear system 300a may comprise a plurality of thin flexible semi-rigid wires 302 coupled to the UAV 100 (e.g., the airframe 102) at their proximal ends via a mounting bracket 306. To reduce friction, the distal end of each flexible semi-rigid wire 302 may comprise a surface contactor 304 that is a low-friction contactor (e.g., a low-friction spherical ball). While the first flexible landing gear system 300a illustrates six flexible semi-rigid wires 302, additional (or fewer) flexible semi-rigid wires 302 may be employed (e.g., 3 to 20, more preferably 4 to 15, most preferably, 6 to 12). Typically, at least 3 flexible semi-rigid wires 302 and/or surface contactors 304 would be used as such an arrangement provides a tripod formation, defining a stable triangular footprint/base. As noted above, the mounting bracket 306 may be removably coupled with the UAV 100 to allow the operator to interchange landing gear type depending on the operation.

The second flexible landing gear system 300b, of which front and side views are illustrated in FIGS. 3b and 3c, is similar to the first flexible landing gear system 300a in terms of function; however, instead of flexible semi-rigid wires 302, the second flexible landing gear system 300b employs two low-friction landing skids 312 coupled to the UAV via a set of flexible support struts 310 and a mounting bracket 306. Again, the mounting bracket 306 may be removably coupled with the UAV 100 to allow the operator to interchange landing gear type depending on the mission.

As can be appreciated, the flexible landing gear systems 300a, 300b shown in FIGS. 3a through 3c share a number of features. First, each design provides a wide stable base, where the surface contactors are spread across a relatively large area. When a load is applied, each of the flexible landing gear systems 300a, 300b are flexible and configured to bend outwardly (e.g., away from the airframe 102) via the flexible supports (e.g., the flexible semi-rigid wires 302 or flexible support struts 310), thereby absorbing force. The points of contact with the ground are low friction to mitigate introduction of unwanted additional forces.

Figure 4A:
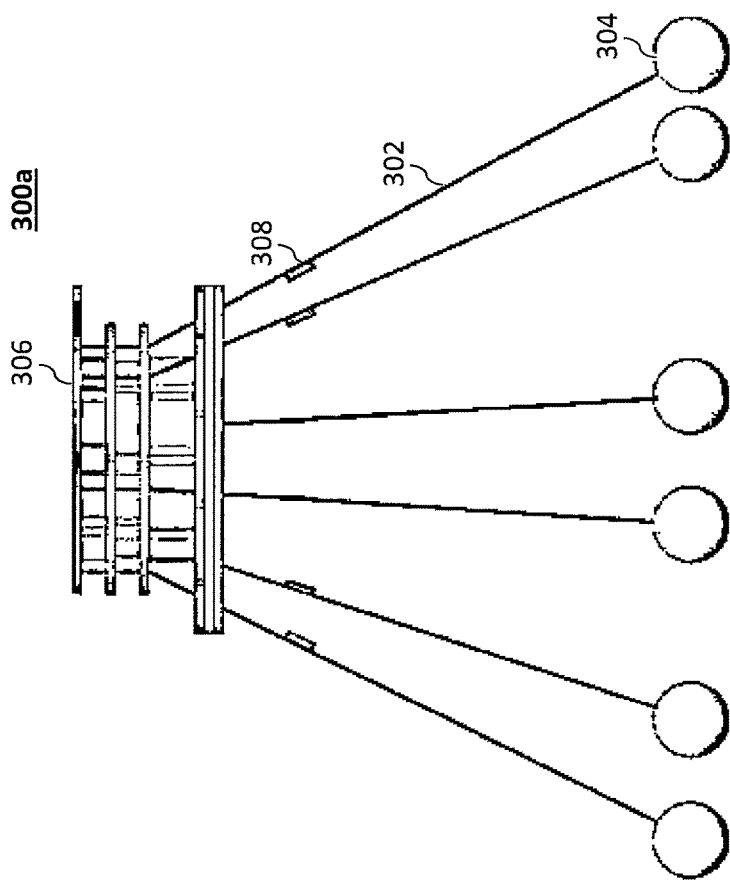
Figure 4B:
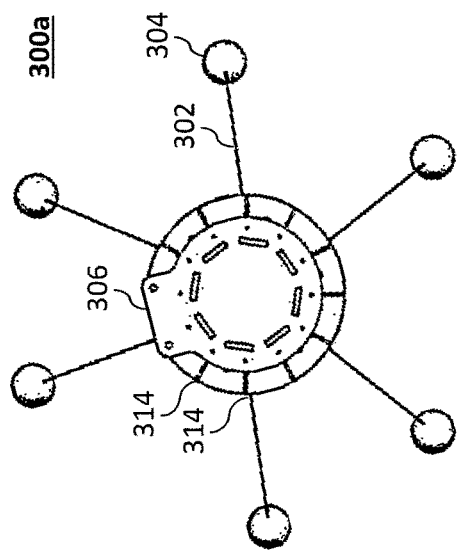
Figure 4C:
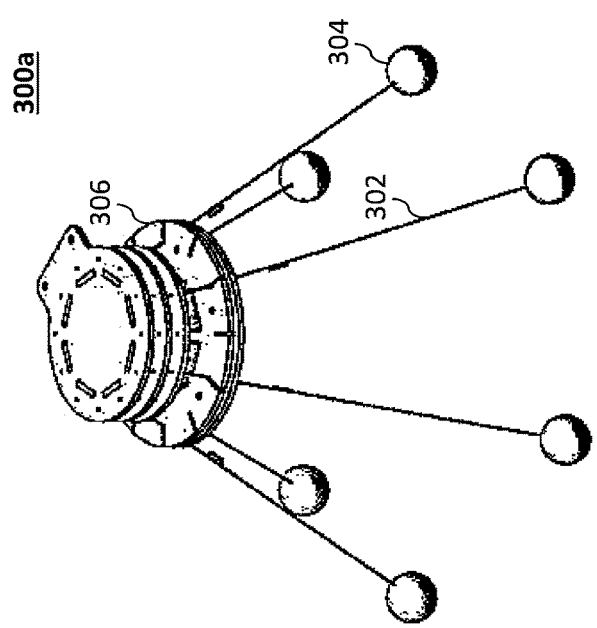

FIGS. 4a through 4c illustrate, respectively, side, top plan, and isometric views of the first flexible landing gear system 300a. As noted above, each of the low-friction contactor 304 may be a lightweight spherical ball. The low-friction contactor 304 is coupled to the mounting bracket 306 via the flexible semi-rigid wires 302. The plurality of flexible supports may be arranged to flare from the mounting bracket (e.g., downward in an aircraft coordinate system—toward the stable surface 202), thereby defining a wide footprint. The wide footprint may have an area that is at least double the area of the mounting bracket.

Where a circular mounting bracket 306 is used, the flexible semi-rigid wires 302 may be arranged to flare conically from the mounting bracket 306, thereby defining a wide, generally circular footprint. For example, the distance across the wide footprint (the diameter, where a wide, generally circular footprint is formed) may be about 2 to 4 times the distance across the mounting bracket 306 (e.g., a circular mounting bracket 306). As a result, the area of the generally circular footprint may be about four to sixteen times the area of the mounting bracket 306. One of skill in the art would appreciate in view of the subject disclosure that the area of the wide footprint may be adjusted to meet a particular need by adjusting the quantity of flexible supports (e.g., the flexible semi-rigid wires 302), adjusting the length of the flexible supports, the angle at which the flexible supports are coupled to the mounting bracket 306 (dictating the outward flare angle), and/or the thickness/diameter of the flexible semi-rigid wires 302 (or other flexures).

To monitor contact with the stable surface 202, a strain sensor 308 (e.g., a strain gauge) may be provided on one or more (or each) of the flexible supports. The strain sensor 308 may be used during flight to provide feedback to the UAV's aircraft processor 116 or flight controller 120, thereby maintain a desired hover height/altitude relative to the stable surface 202. As illustrated, each of said plurality of strain sensors 308 can positioned on one of the plurality of flexible semi-rigid wires 302 and/or flexible support struts 310. For example, a strain sensor 308 can be positioned on one or more of the flexible supports 302, 310 at a point that is near the airframe 102. For example, at a location that is between the proximal end (its connection point to the UAV 100/mounting bracket 306) and a midpoint that is half way between the proximal end and the distal end (e.g., at the contactor 304) of the flexible supports 302, 310.

Each of the flexible semi-rigid wires 302 may be secured to the mounting bracket 306 via a wire slot 314. The wire slots 314 allow for the operator to replace one or more flexible semi-rigid wires 302 in the event of damage. Further, the mounting bracket 306 may be provided with additional wire slots 314 to allow the operator to install additional flexible semi-rigid wires 302 (e.g., to account for larger payloads) or to relocate/install the flexible semi-rigid wires 302 in a predetermined arrangement/pattern (whether distributed evenly along the perimeter, as illustrated, or clustered). For example, as illustrated, while only six flexible semi-rigid wires 302 are employed, twelve wire slots 314 are provided. While a wire slot 314 is illustrated, other attachment devices may be used to couple the flexible semi-rigid wires 302 to the mounting bracket 306. For example, the flexible semi-rigid wires 302 may be secured to the mounting bracket 306 using threaded couplings (e.g., screws), snaps, clips (e.g., spring clips), etc.

In operation, the propulsors 108 (under control of the aircraft processor 116 or flight controller 120—based on feedback form the strain sensors 308, for example) dictate the amount of aircraft weight that is supported by the flexible landing gear, resulting in different amounts of deflections. Therefore, various sensors (e.g., sensors of the ISR payload 126, strain sensors 308, etc.) may be positioned on the UAV 100 and/or flexible landing gear systems 300a, 300b to assist in autopilot tuning and/or training. Suitable sensors tuned to take advantage of a compliant (i.e., flexible) landing gear design may include, inter alia, strain sensors 308 or altitude sensors (e.g., sonars, lasers, etc.). That is, a strain sensor 308 could also be used to quantify the contact force between the UAV 100 (e.g., via the landing gear) with the stable surface 202 if specific forces are required for the application. A well-tuned flight controller 120 can allow a payload sensor to be placed anywhere on the UAV 100 and moved about surface 202 with a high degree of accuracy and precision.

The altitude of the UAV 100 is controlled with variations on the overall thrust level. When the propulsor 108 thrust on one side is greater than the thrust on the other (i.e., an imbalanced propulsor 108 thrust condition), the flexible supports/legs (e.g., the flexible semi-rigid wires 302 and/or flexible support struts 310) on each side are free to be loaded independently. That is, the leg with the higher load will deflect more, pushing the end of the leg further from the center of the UAV 100, while also lowering that side of the UAV 100. In this position the moment from the imbalanced thrust equals the moment from the legs, preventing tip over, and allowing the system to slide while still in contact with the ground. This counters the negative affect illustrated in FIG. 2b in relation to inflexible rigid struts 112.

To validate the improved performance afforded by flexible landing gear systems in low altitude operations, tests were performed where a multi-rotor UAV was manually piloted, with the objective of placing a sensor on alternating points on the ground. Two data sets were produced by running the same test with two different landing gears— traditional and flexible. The traditional rigid landing gear 110 had a sensor affixed to a rigid post, creating a non-compliant contact point with the ground, while the first flexible landing gear system 300a (e.g., FIG. 3a, FIGS. 4a-4c) provided a compliant and wide based point of contact.

For the test, the first flexible landing gear system 300a was rapidly prototyped by laser cutting the flat parts (e.g., the components of the mounting bracket 306) and bending tempered high-carbon steel (spring steel) to form the flexible semi-rigid wires 302. A lightweight hollow sphere (e.g., about 10 mm to 100 mm in diameter, more preferably about 20 mm to 60 mm in diameter, most preferably about 40 mm in diameter) was affixed the distal end of each flexible semi-rigid wire 302 to serve as the low-friction contactor 304, although other shapes are contemplated. The low-friction contactor 304 may be fabricated from low friction materials, such as, for example, plastic, celluloid, etc. The first flexible landing gear system 300a was mounted to a quadcopter UAV.

Figure 6A:
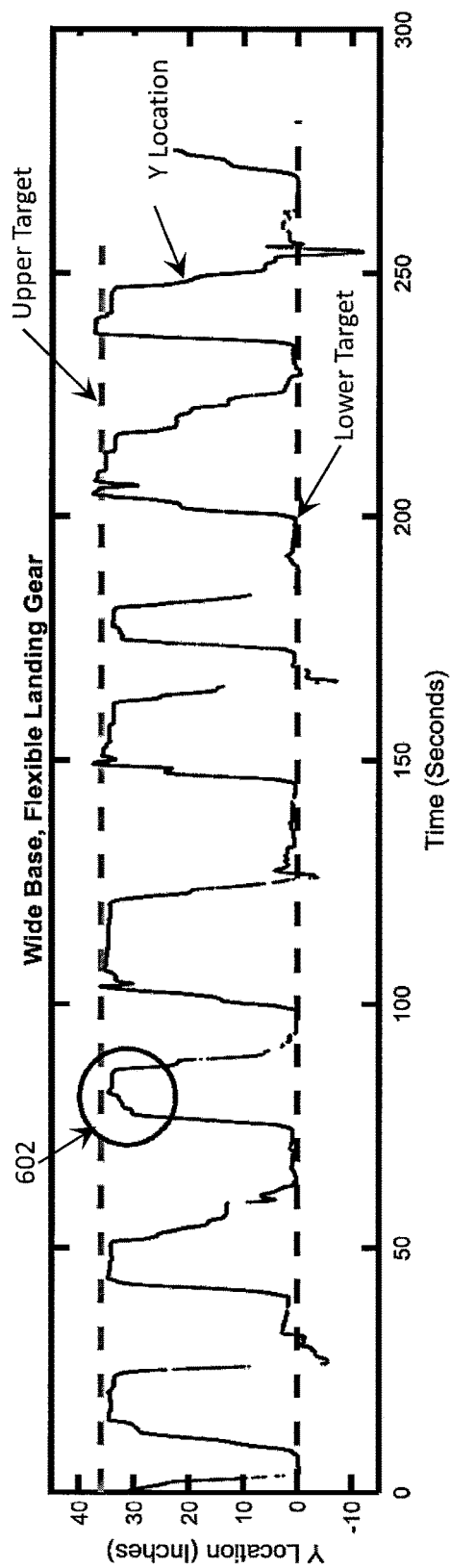
FIGS. 6a and 6b illustrate a graph of the in plane performance of a VTOL UAV equipped with stiff landing gear vis-à-vis a VTOL UAV with wide-base, flexible landing gear.
Figure 6B:
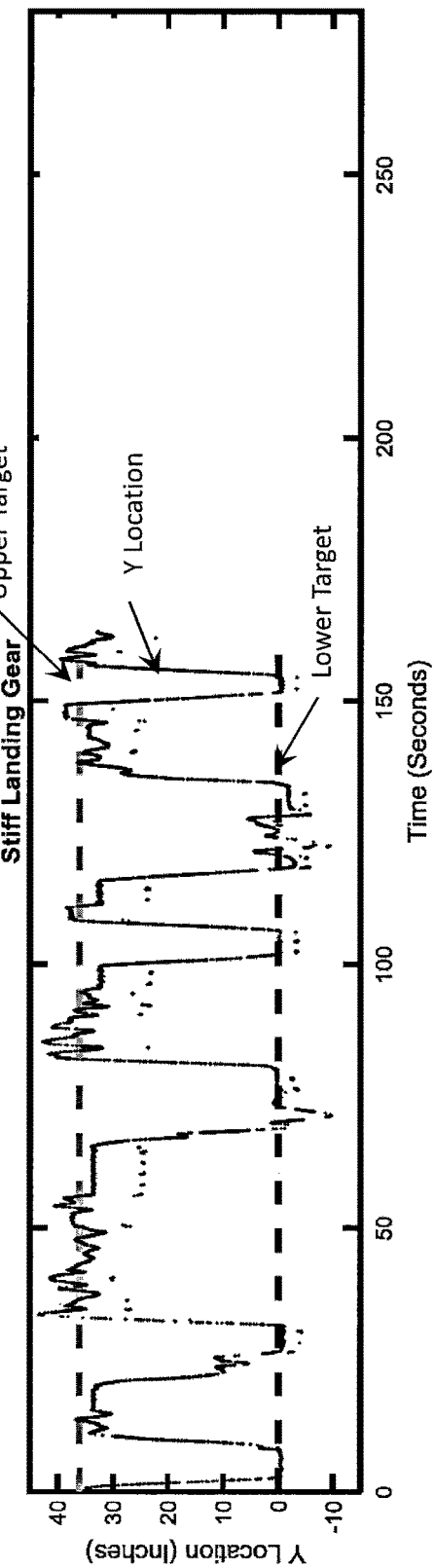

Experiments have demonstrated that a flexible landing gear system enables semi-hover flight near the ground with much greater accuracy. FIGS. 5a and 5b demonstrate the ability of the compliant landing gear to maintain a predetermined vehicle hover height (e.g., the altitude relative to the stable surface 202) near the stable surface without the undesired oscillations created by ground effect. During the test, the vehicle hover height using the flexible landing gear yielded a standard deviation of 1.59 inches, while using the stiff landing gear the standard deviation was 3.5 inches. Additional tuning of the flight controller 120 may be performed to further improve performance of the UAV 100 with compliant, flexible landing gear 300a, 300b. In addition to a more consistent vehicle hover height, the compliant, flexible landing gear 300a, 300b allows for sensors on the UAV 100 to be moved from one target object to another target object more accurately. FIGS. 6a and 6b demonstrate that, with the compliant gear, the sensor is moved accurately from one target object to another target object with significantly less settling time. The approach circled at point 602 shows the ability to correct for errors in position by slowly sliding at least a portion of the flexible landing gear across the stable surface while maintaining contact.

Figure 7A:
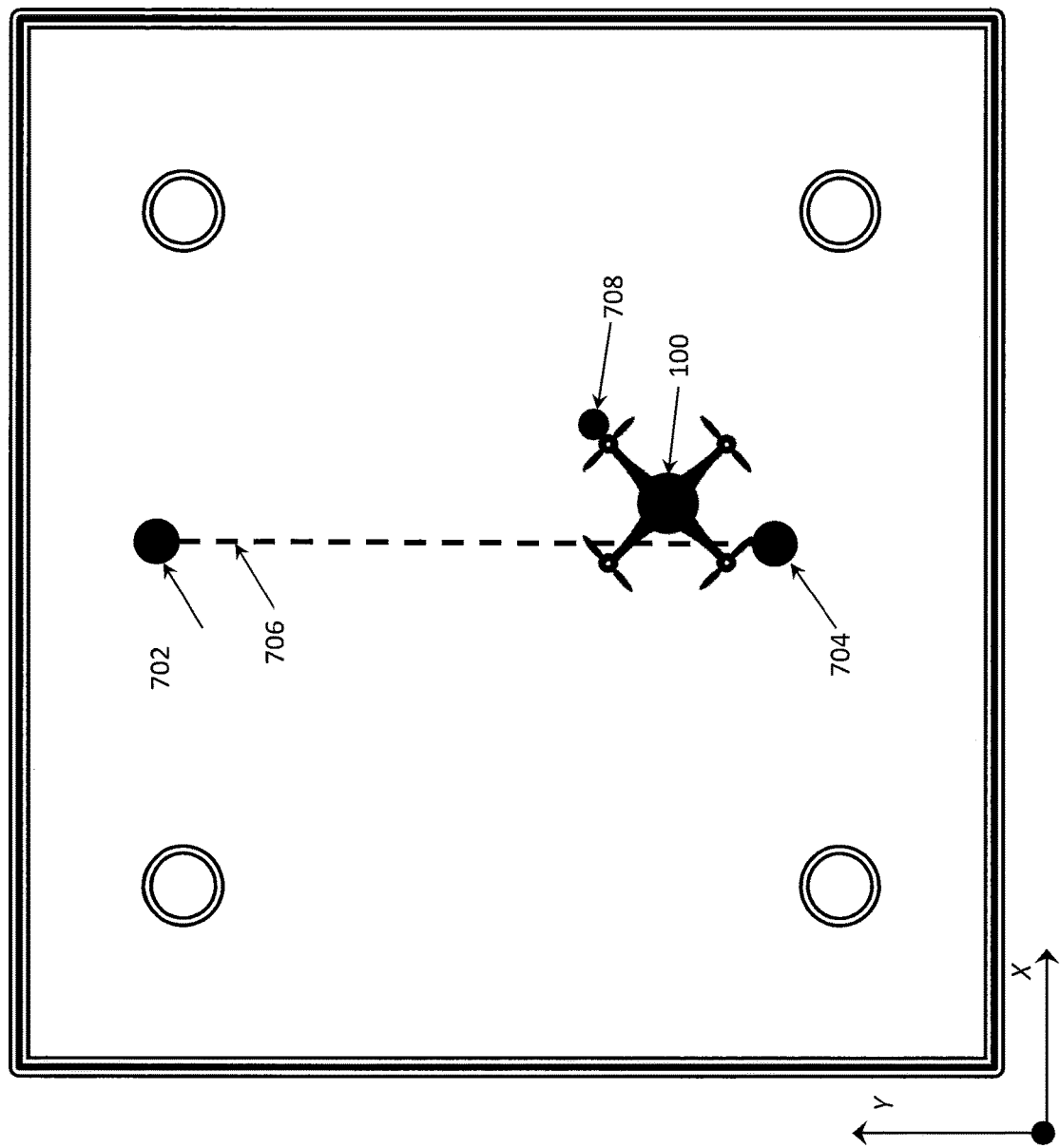
FIG. 7a illustrates an overhead view of the layout for a landing gear performance test of a VTOL UAV equipped with stiff landing gear and a VTOL UAV with wide-base, flexible landing gear.

To demonstrate the improved performance of a flexible landing gear system during near-ground operation, a test was run in accordance with the layout illustrated in FIG. 7a where a multi-rotor UAV 100 was manually piloted with the objective of placing a sensor 708 on alternating way-points points on the ground. An objective of this experiment was to measure the accuracy and predictability of flying the UAV 100 between two distinct way-points on the ground, i.e., an upper way-point 702 and a lower way-point 704. As illustrated, the upper and lower way-points 702, 704 are aligned vertically and oriented (i.e., spaced) along the center line 706 in the Y direction. Thus, an accurate flight would resemble a step response from the lower way-point 704 to the upper way-point 702 along the center line 706, and then from the upper way-point 702 to the lower way-point 704 (and repeated a few times). A video of the test was then processed to determine the X and Y position of the sensor 708 relative to the upper and lower way-points 702, 704, as well as the height of the UAV 100 above the ground (i.e., the Z direction in this example). One landing gear had the sensor 708 affixed to a rigid post, creating a non-compliant contact point with the ground, while the other employed landing gear with a compliant and wide based point of contact in accordance with an aspect of this disclosure.

Two data sets were produced by running the same test with two different landing gears on a UAV 100, i.e., rigid and flexible. FIGS. 7b and 7c illustrate how close the sensor 708 was to the centerline 706 between the two targets, 702, 704. The standard deviation for the compliant, flexible landing gear test was 2.88 inches, and for the rigid landing gear 110 the standard deviation was 4.06 inches. The data demonstrates that a UAV 100 with compliant, flexible landing gear took a more direct path between the way-points 702, 704 on average than the rigid landing gear. From the results, it is apparent that the flexible landing gear system resulted in faster, smoother, more predictable, and more accurate travel along the centerline 706 between the two ground way-points 702, 704. This is shown by the faster travel between the two way-points 702, 704, more accurate settling to each point, less deviation in X (i.e., deviation off the centerline 706). A reason for this is that the flexible landing gear is easier to fly along the ground, and also easier to nudge or scoot once near the goal. Conversely, the rigid landing gear requires that the UAV 100 lift off the ground to move. Thus, when it lands near (but not on) the goal, the UAV 100 has to completely lift off from the ground and re-land. In other words, with rigid landing gear, it is more difficult to move short distance (e.g., a few centimeters or inches) once landed.

Where a definition or the usage of a term in a reference that is incorporated by reference herein is inconsistent or contrary to the definition or understanding of that term as provided herein, the meaning of the term provided herein governs and the definition of that term in the reference does not necessarily apply. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the teachings of the subject disclosure may therefore be practiced otherwise than as specifically described above.

What is claimed is:

1. A flexible landing gear system for an aircraft, the flexible landing gear system comprising:
   a mounting bracket configured to couple to the aircraft;
   a plurality of flexible supports, each of the plurality of flexible supports having a proximal end and a distal end, wherein each of the plurality of flexible supports is coupled to the mounting bracket at its proximal end;
   a first strain sensor positioned on at least one of the plurality of flexible supports and configured to measure an amount of deflection exhibited by said at least one of the plurality of flexible supports, wherein the first strain sensor is operatively coupled to a flight controller configured to maintain a controlled distance between the aircraft and a stable surface using the amount of deflection measured by the first strain sensor;
   a second strain sensor positioned on a different one of the plurality of flexible supports, wherein the strain sensor and the second strain sensor are configured to quantify contact force between the aircraft and the stable surface at two locations to facilitate pitch adjustment via the flight controller during hover or flight operation; and
   a plurality of surface contactors, wherein the plurality of surface contactors is positioned at the distal end of each of the plurality of flexible supports.

2. The flexible landing gear system of claim 1, wherein each of the plurality of flexible supports is a flexible semi-rigid wire.

3. The flexible landing gear system of claim 2, wherein each of the plurality of surface contactors is a low-friction contactor.

4. The flexible landing gear system of claim 1, wherein each of the first strain sensor and the second strain sensor are configured to provide feedback to a control system of the aircraft.

5. The flexible landing gear system of claim 1, wherein the plurality of flexible supports are arranged to flare conically from the mounting bracket, thereby defining a wide footprint.

6. The flexible landing gear system of claim 1, wherein the mounting bracket comprises a plurality of slots along its perimeter, each slot being configured to secure one of said plurality of flexible supports at its proximal end.

7. The flexible landing gear system of claim 6, wherein the plurality of slots enables a user to selectively secure a desired quantity of flexible supports to account for a desired payload or weight distribution.

8. The flexible landing gear system of claim 1, wherein each of the plurality of flexible supports are configured to flex independently.

9. The flexible landing gear system of claim 6, wherein each of the plurality of flexible supports is removable coupled to the mounting bracket at one of the plurality of slots.

10. The flexible landing gear system of claim 9, wherein each of the plurality of flexible supports is coupled to the mounting bracket via a threaded coupling, a snap, or a clip.

11. The flexible landing gear system of claim 1, wherein the first strain sensor is positioned on the at least one of the plurality of flexible supports at a location that is between mounting bracket and a midpoint that is half way between a proximal end and a distal end of the at least one of the plurality of flexible supports.

12. The flexible landing gear system of claim 1, wherein the mounting bracket is configured to removably couple with the aircraft.

13. The flexible landing gear system of claim 1, wherein the plurality of flexible supports defines a footprint having a width that is at least double that of the mounting bracket.

14. The flexible landing gear system of claim 1, wherein the plurality of flexible supports defines a footprint having a width that is at least quadruple that of the mounting bracket.

15. The flexible landing gear system of claim 1, wherein each of the plurality of surface contactors is a hollow sphere.

16. The flexible landing gear system of claim 1, wherein each of the plurality of flexible supports is composed of tempered carbon steel.

17. The flexible landing gear system of claim 1, wherein a strain sensor is positioned on each of the plurality of flexible supports.

18. The flexible landing gear system of claim 1, wherein the flight controller is configured to control its lift motors based on the contact force between the aircraft and the stable surface.

19. The flexible landing gear system of claim 1, wherein the flight controller is configured to independently control each of its lift motors to generate a desired lift thrust for each of the lift motors based on the contact force between the aircraft and the stable surface.

* * * * *